S. V. R. York,
Bridle Bit,
Nº 77,235.   Patented Apr. 28, 1868.
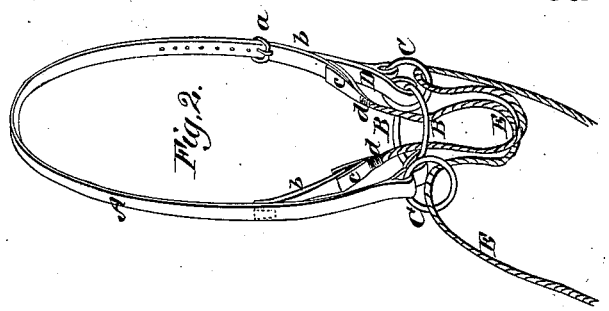
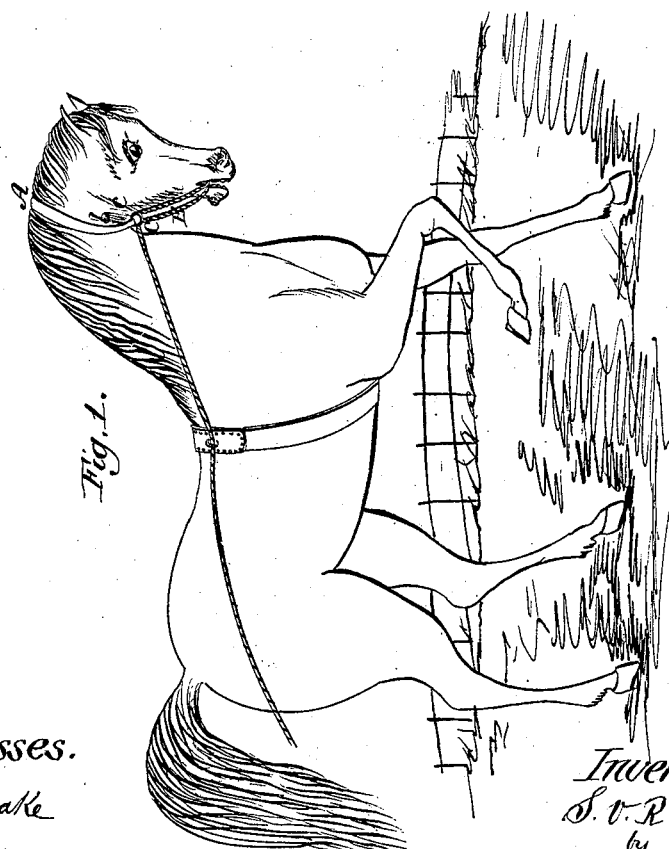
Witnesses.
J. R. Drake
Geo. W. Miatt
Inventor.
S. V. R. York.
by
J. Fraser + Co.
attys

United States Patent Office.

S. V. R. YORK, OF ANTWERP, NEW YORK.

Letters Patent No. 77,235, dated April 28, 1868.

---

IMPROVED BITTING-ATTACHMENT.

---

*The Schedule referred to in these Letters Patent and making part of the same.*

---

TO ALL WHOM IT MAY CONCERN:

Be it known that I, S. V. R. YORK, of Antwerp, in the county of Jefferson, and State of New York, have invented a new and improved Bitting-Attachment for breaking horses; and I do hereby declare that the following is a full and exact description thereof, reference being had to the accompanying drawings, in which—

Figure 1 is a side view of the bitting-attachment, as applied to a horse.

Figure 2 is a perspective view of my bitting-attachment.

Like letters of reference designate corresponding parts in all the figures.

My invention consists of an apparatus composed of a neck-strap, having two small ropes connected therewith by means of elastic webbing, in combination with a guiding-ring and bearing-rings, so arranged and applied to the head and mouth as to form a bitting-attachment for breaking colts and subduing vicious horses, and giving them an easy and governable mouth.

By reference to the drawings, it will be seen that my apparatus consists of a strap, A, three feet in length, one and a half inch wide, one end of which is sewed and made fast to a two-inch iron ring, B. At the same end, and on the outer side, there is stitched and made fast a one inch and a half iron ring, C, dropping partly below the two-inch ring B. To the two-inch ring there is also attached a strap, D, eight inches in length, and provided with a buckle, $a$, at the upper end, the other end being sewed fast to the two-inch ring. On the outer side, and made fast to this strap, is another inch and a half ring, C', like the one previously described.

This strap is buckled around the horse's neck, on the near side, about six inches back of his head, leaving the three rings hanging directly under his neck. Attached to the inner side of this strap, on both sides of his neck, is an elastic rubber webbing, $b\ b$, six inches in length. One end of said webbing is stitched fast to the strap, eight inches from the two-inch ring, letting the lower end drop down within about two inches of said ring. To these pieces of webbing a cotton, hair, or hemp cord, E E, one-half inch in diameter, is attached, as follows: A short piece of leather, $c\ c$, firmly sewed to the webbing, and connected with the cord E, by winding with wire or waxed thread $d\ d$, secures the two together.

When this strap is around the horse's neck, as above described, the two cords drop through the two-inch ring B. The cord that is attached to the webbing on the near side of the horse's neck is passed through the mouth to the off side, thence through the one and one-half inch ring; also, the cord that is attached to the webbing on the off side of the neck is passed through to the near side, and through the one and a half inch ring, in the same manner. Both cords now pass through the horse's mouth in opposite directions.

The following is a description of the practical working of my invention:

The operator stands at the near side of the horse's head, and, with the cord that passes from the off side to the near side, gives him a quick jerk, which brings him suddenly toward you, also carrying his head quickly into the air. The operator then steps to the off side, and gives a sudden pull to the cord which passes from the near side, through the mouth, to the off side of the horse, which has the same effect on him as before.

The yielding of the elastic webbing causes the cord to slide through the animal's mouth when pulled, creating a burning sensation, which causes him to yield very readily at the touch of the rein. This operation being repeated for about ten minutes at a time, for three or four days, has the effect to produce an easy, governable mouth, and the horse carries his head gracefully, and comes to the rein quickly and handily.

What I claim as my invention, is—

The combination, with the neck-strap A, provided with the ring B, of the elastic webbings $b\ b$, cords E E, and bearing-rings C C', arranged, applied, and operating substantially as and for the purposes set forth.

In witness whereof, I have hereunto signed my name, in the presence of two subscribing witnesses.

S. V. R. YORK.

Witnesses:
  J. R. DRAKE,
  GEO. W. MIATT.